(12) United States Patent
Guiney et al.

(10) Patent No.: US 7,140,738 B2
(45) Date of Patent: Nov. 28, 2006

(54) SYSTEM AND METHOD FOR CALIBRATING POSITION OF MICROSCOPE SLIDE WITHIN STORAGE RECEPTACLE

(75) Inventors: Patrick Guiney, Concord, MA (US); Scott Wolpert, Westford, MA (US)

(73) Assignee: Cytyc Corporation, Marlborough, MA (US)

( * ) Notice: Subject to any disclaimer, the term of this patent is extended or adjusted under 35 U.S.C. 154(b) by 182 days.

(21) Appl. No.: 10/998,028

(22) Filed: Nov. 24, 2004

(65) Prior Publication Data

US 2006/0109432 A1 May 25, 2006

(51) Int. Cl.
*G03B 23/00* (2006.01)
(52) U.S. Cl. .................................................. 353/103
(58) Field of Classification Search ................ 353/103, 353/108, 112–116, 118, 120; 352/232, 236
See application file for complete search history.

(56) References Cited

U.S. PATENT DOCUMENTS 4,248,498 A * 2/1981 Georges ...................... 359/393

* cited by examiner

*Primary Examiner*—Melissa Jan Koval
*Assistant Examiner*—Andrew Kong
(74) *Attorney, Agent, or Firm*—Vista IP Law Group LLP

(57) ABSTRACT

System and method for calibrating the orientation or arrangement of slides in a storage receptacle. A reflective marking is asymmetrically applied to a side or edge of a slide, forming reflective and non-reflective sections. Light is directed to the slide, and a sensor detects light that is reflected by the reflective sections and generates signal or data representing an orientation of the slide. A controller processes the signal or data to determine whether the slide is properly oriented on a tray in the storage receptacle, e.g., whether the slide is flat or at an angle, upside down, rotated. The marking can be reflective ink, paint or an adhesive. Reflective and non-reflective markings can also be formed by laser etching, polishing, or by frosting.

45 Claims, 5 Drawing Sheets

SYSTEM AND METHOD FOR CALIBRATING POSITION OF MICROSCOPE SLIDE WITHIN STORAGE RECEPTACLE

FIELD OF THE INVENTION

The present invention relates to slide storage receptacles, and more particularly, to a system and method for calibrating or confirming the orientation of slides within a slide storage receptacle.

BACKGROUND

Various devices have been used to store glass slides, such as microscope and patient test slides. One known storage receptacle is a slide cassette. A cassette typically includes a pair of trays and or retaining members or fingers that extend from the cassette and below a slot. A slide fits into a slot and onto a tray. Each slot receives a single slide. The dimensions of a slot are typically larger than the dimensions of a slide so that the slide can be easily inserted into and removed from the slot.

Automated or semi-automated imaging systems use robotic actuators or other devices to remove a slide from the cassette, process the slide or specimen, and return the slide into the cassette. For example, one device may acquire a slide from a cassette and position it beneath a microscope or other device so a cytotechnologist can analyze the sample for cancer and other medical conditions. More specifically, the imaging system grasps the slide, lifts it above the retaining members of the trays, removes the slide from the trays and the slot, and positions the slide beneath the microscope. The imaging system re-inserts the slide into the cassette after the analysis is completed.

The manner in which imaging systems and other devices check the orientation of slides in a slide cassette can be improved. Ideally, all of the slides are properly arranged flat on the trays inside the cassette and in a similar manner. However, as a result of human or machine errors, slides may be improperly loaded into a cassette. For example, a slide may not rest flat on the trays. Instead, the slide may only partially clear one of the trays and come to rest at an angle. Further, the slide can be inserted upside down so that surface with a specimen sample is facing downward, whereas other slides may have their specimen samples facing upward. Further, slides can be twisted around. In other words, the slide may be inadvertently rotated 180 degrees. This may present a problem when, for example, a bar code or other data is present on one end of a slide.

Slides that are improperly positioned may also be broken by equipment that is programmed to select slides since the equipment is typically configured to select or re-insert a slide that is oriented in a particular manner. Thus, equipment errors and broken slides can result from misplaced slides. These errors can also result in system downtime while a cytotechnologist or technician is forced to examine the cassette and rearrange misplaced slides or retrieve broken slides.

Accordingly, there exists a need for a system and method that checks or provides an indication of the arrangement or orientation of slides in a cassette to ensure that all of the slides are properly arranged. Such a system and method would improve the performance of processing equipment, safety, throughput and operator convenience.

SUMMARY

According to one embodiment, a system for calibrating an orientation of slides within a storage receptacle includes a reflective marking, an emitter, a detector, and a controller. The reflective marking is applied to an edge of a slide to form reflective and non-reflective sections. The emitter and detector are positioned so that the emitter directs light towards the reflective and non-reflective sections of the slide, and the detector generates data representing an orientation of the slide based on the reflected or non-reflected light. The controller processes a signal or data from the detector to determine whether the slide is properly oriented on a tray in the storage receptacle.

According to an alternative embodiment, a system for calibrating the orientation of a slide within a storage receptacle includes a reflective marking, a vertical translation member, an emitter, a detector and a controller. The reflective marking is applied to an edge of a slide to form an asymmetric reflective section and an asymmetric non-reflective section. The emitter and detector are vertically moveable by the vertical translation member. The emitter directs light towards the asymmetric reflective and non-reflective sections, and the detector receives reflected light and generates a signal or data representing an orientation of the slide. The controller processes the signal or data from the detector to determine whether the slide is properly oriented on a tray in the storage receptacle. The slides are properly arranged on respective trays in the storage receptacle when the reflective markings are aligned.

A further alternative embodiment is directed to a method of calibrating an orientation of a slide within a storage receptacle. The method includes asymmetrically marking at least a portion of an edge of a slide with a reflective coating, thereby forming an asymmetric reflective section and an asymmetric non-reflective section. An edge of the slide is exposed to light, and reflected light is detected. Data representing an orientation of the slide is generated based on the detected light, and a determination of the orientation of the slide is made based on the generated data.

In various embodiments, the reflective marking can be a reflective coating, such as an ink or a paint. The reflective marking can also be an adhesive or frosted coating. Sections of different reflectivities can also be formed using laser etching, polishing and grinding.

Various patterns of reflective and non-reflective patterns can be used with different embodiments. For example, the reflective marking being applied to less than or more than half of the slide edge. Further, the reflective marking can extend completely or partially between a top and a bottom of an edge and completely or partially between sides of an edge. A reflective marking may also form different numbers of reflective and non-reflective sections.

Further, the reflective marking can be applied to form an asymmetric pattern. For example, the reflective and non-reflective sections can be offset relative to a midpoint of the edge of the slide. This may be useful to determine when the slides are properly aligned based on the asymmetric markings being aligned with each other.

Systems can include one or more translation members, including vertical and horizontal translation members that move or rotate the emitter and detector to different positions, e.g., to different slides.

The emitter can be, for example, a Light Emitting Diode. Emitter and detector combinations can include a video camera, a fiber optic sensor or a bar code scanner.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof, and which show by way of illustration specific embodiments that may be practiced. It is to be understood that structural changes may be made without departing from the scope of embodiments.

A system and method are disclosed for calibrating the orientations of slides in a storage receptacle, such as a cassette, so that a determination can be made that the slides are properly arranged. The system includes a reflective marking that is applied to an edge or a side of a slide, thereby forming a reflective section and a non-reflective section on the side or edge of the slide. Persons skilled in the art will appreciate that the reflective markings can be applied to a "side" or an "edge" of a slide. For purposes of explanation, not limitation, this specification generally refers to an edge of a slide. Light is provided by an emitter and directed to the edge of the slide having the reflective marking. Portions of the light are reflected from the reflective marking and received by a detector. A signal or data from the detector is provided to a controller, which determines the orientations of the slides in the cassette. After analyzing one slide, a vertical translation member is used to raise or lower the emitter and detector to obtain orientation data for another slide in the cassette. The controller can provide an indication that a slide is not positioned properly. A cytotechnologist can also make this determination based on a visual inspection of the reflections markings. Additional details regarding system components and their operation follow.

Figure 1:
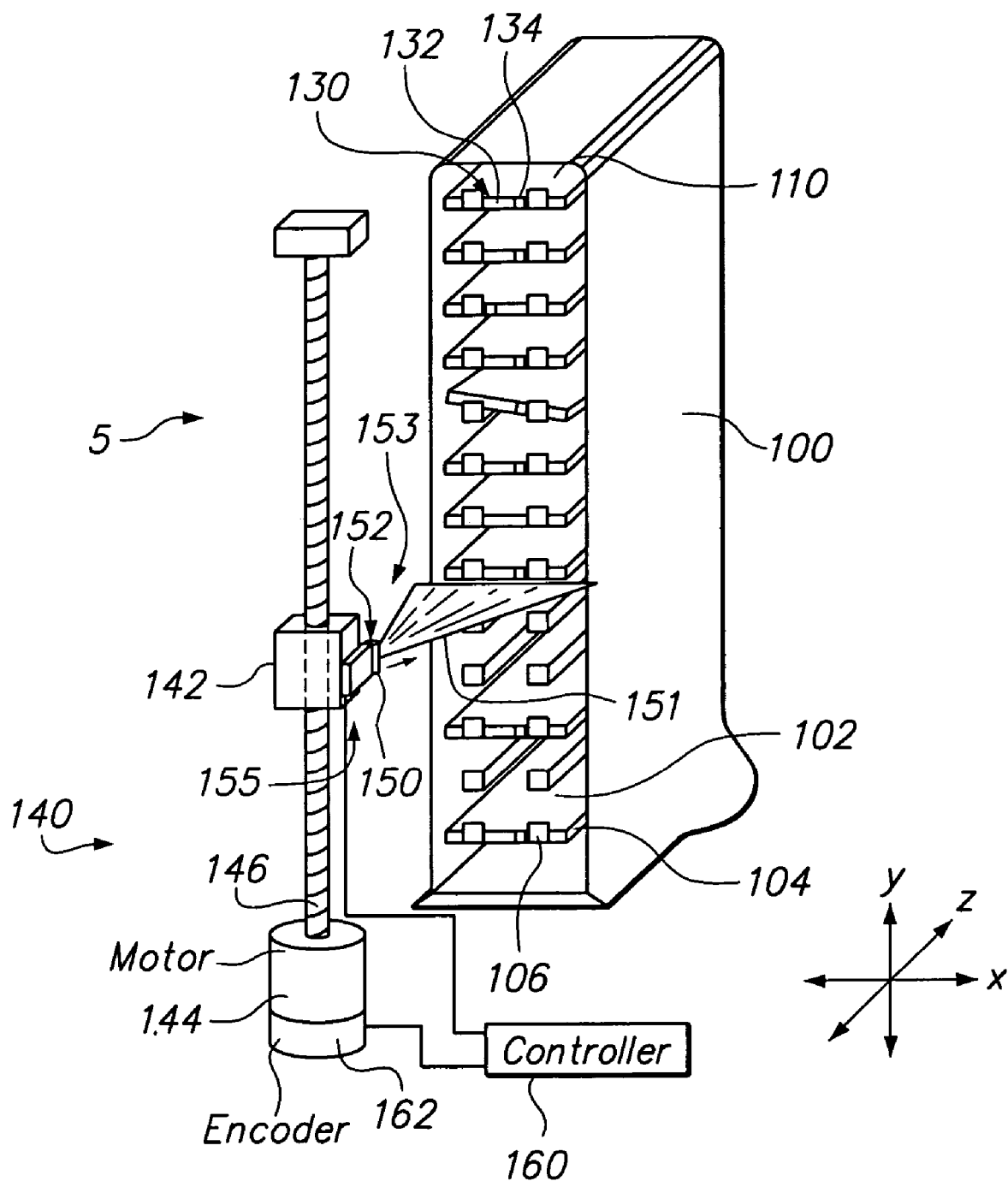
FIG. 1 is a perspective view of a system for calibrating an orientation of slides in a slide cassette according to one embodiment.

Referring to FIG. 1, one exemplary slide cassette 100 includes a plurality of horizontal slots 102, slides 110 that are stored within the cassette 100, trays or fingers 104 that hold a slide 110 and retaining lips 106 that prevent the slide 110 from falling out of the cassette 100. One exemplary cassette 100 having the illustrated configuration is part no. 70292-000, available from Cytyc Corporation, 85 Swanson Road, Boxbourough, Mass. 01719. For reference, the direction into the cassette 100 is the "z" direction and the directions corresponding to the width and height of an edge of a slide are respective "x" and "y" directions.

Figure 3:
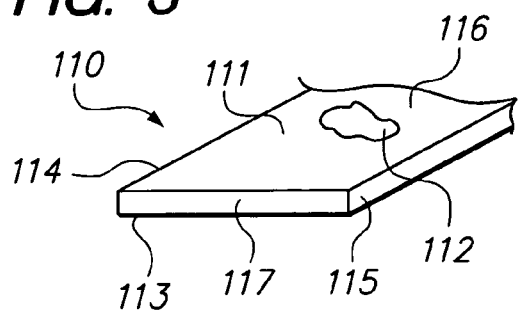
FIG. 3 is a perspective view of a slide having sides that are longer than front faces or edges.
Figure 4:
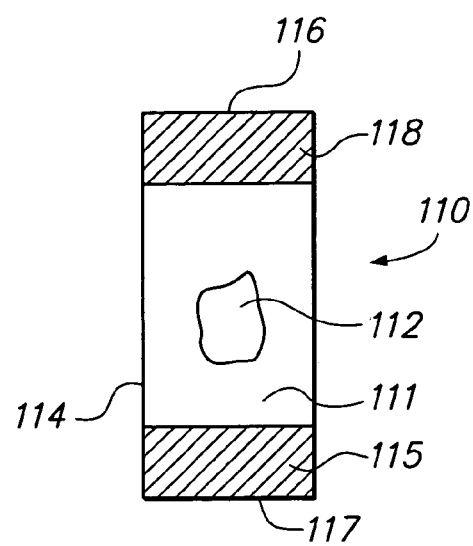
FIG. 4 is a top view of a slide having sides that are longer than front faces or edges and having frosted end sections.

As shown in FIG. 3, one exemplary slide 110 has top surface 111 with a test sample or specimen 112, a bottom surface 113, a first side 114, a second or opposite side 115, a first edge 116 that is placed within a slot 102, and a second or opposite edge 117. Referring to FIG. 4, some slides may also have frosted sections 118, which can be used to facilitate printing numbers on to the slide 110 or to identify sections of the slide 110 that should be handled. The slides shown in FIGS. 3 and 4 are generally rectangular-shaped slides, having sides 114 and 115 that are longer than edges 116 and 117.

Figure 5:
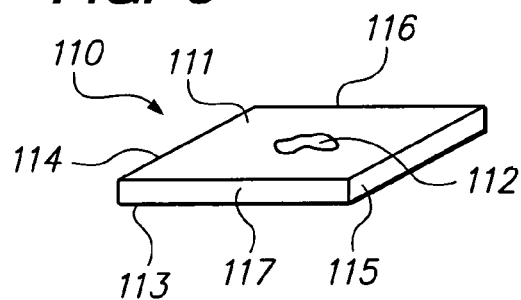
FIG. 5 is a perspective view of a square-shaped slide having sides or edges that are the same length.
Figure 6:
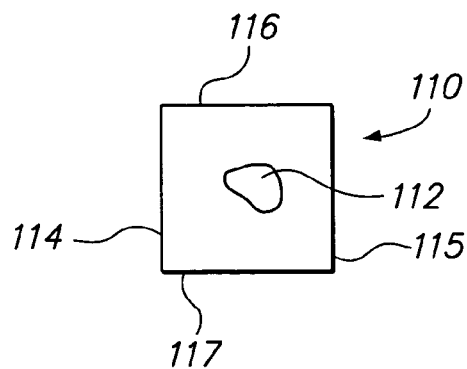
FIG. 6 is a top view of a square-shaped slide.

Persons skilled in the art will appreciate that other slide configurations can be utilized. For example, referring to FIGS. 5 and 6, another exemplary slide 110 is a square-shaped slide having sides 114 and 115 and edges 116 and 117 that are the same length.

Figure 2:
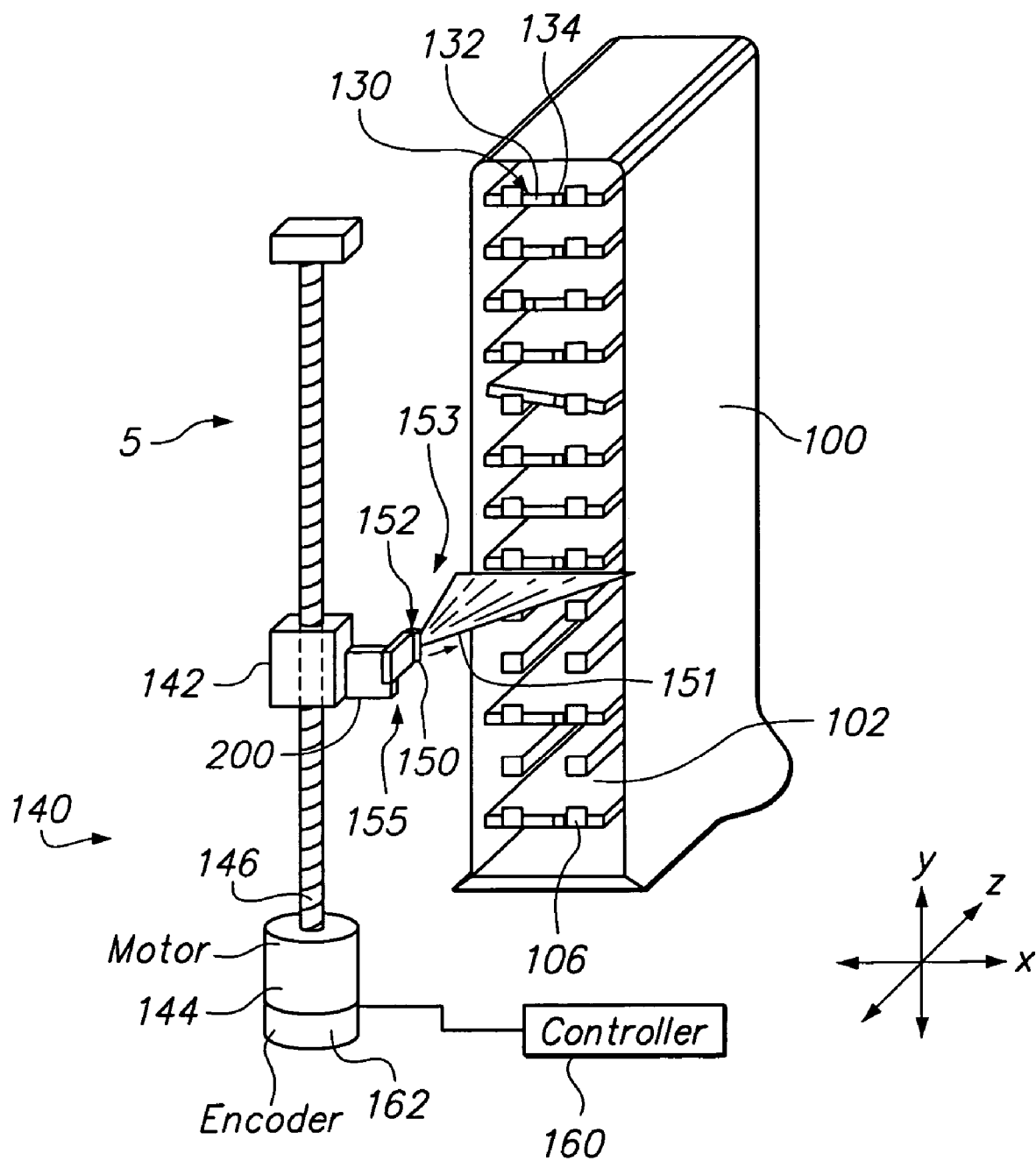
FIG. 2 is a perspective view of a system for calibrating an orientation of slides in a slide cassette that includes a horizontal transaction member according to another embodiment.

For purposes of illustration and explanation, not limitation, this specification refers to rectangle-shaped slides, as shown in FIGS. 2 and 3. Further, persons skilled in the art will appreciate that embodiments of reflective markings can be applied to a side or a shorter edge of a rectangle-shaped slide. For purposes of explanation, not limitation, this specifically refers to an "edge" of a slide. The surface receiving a reflective marking may vary depending on the design and configuration of the cassette and processing equipment.

Referring again to FIG. 1, in normal use, slides 110 are preferably loaded into a cassette 100 so that they are flat, properly positioned, and face upright with the specimen samples 112 being on top surfaces 111 of the slides 110. Thus, all of the slides should be arranged in a similar manner. Persons skilled in the art will appreciate that the "common" orientation can vary depending on the cassette and equipment configurations, however, this specification refers to slides being flat with the specimen sample (if a specimen has been applied to a slide) facing upwardly.

Sometimes however, slides 110 are improperly placed in a cassette 100 so that they are not correctly oriented or positioned. These improperly positioned slides can be identified with embodiments.

According to one embodiment, a system "S" for calibrating the orientation of slides within a storage receptacle includes a reflective marking 130 that is applied to an edge of a slide. The marking 130 forms one or more reflective sections 132 and one or more non-reflective or less reflective sections 134 (generally referred to as "non-reflective" sections in this specification). Persons skilled in the art will appreciate that many materials are not truly non-reflective. Accordingly, references to "non-reflective" in this specification are intended to include materials that are truly non-reflective and materials that are sufficiently less reflective compared to the reflective sections to enable a detector to distinguish reflected light having different intensities. Whether non-reflective or less reflective sections are used may depend on the reflective marking and slide materials, the manner of making the reflective marking and the capabilities of the detector, e.g., the sensitivity of the detector and the abilities of the detector to distinguish light of different intensities. The system can also include a vertical translation member 140 to move the system to different heights, an emitter 150, a detector 152, and a controller 160 with processor. The vertical translation member includes a motor 144 and an encoder 162 for position sensing.

If necessary as shown in FIG. 2, a horizontal or axial translation member 200 (generally "horizontal" translation member) can be used to rotate the emitter 150 and detector 152 to scan or sweep the entire edge of the slide. Whether a horizontal translation member 200 is utilized will depend on the type and configuration and packaging of the emitter 150 and detector 152, and whether the emitter 150 and detector 152 are configured to scan only a portion of the slide edge or the whole edge at one time.

In use, the emitter 150, such as a Light Emitting Diode (LED) or other light source, directs light 151 towards the reflective and non-reflective sections 132 and 134 of the edge of the slide. As a result, a portion of the incident light is reflected 153 by the reflective section(s) 132, but not the non-reflective section(s) 134.

The detector 152 receives the reflected light 153 and generates a signal that represents an orientation of the slide. This signal is digitized and processed by the controller 160, such as a micro-processor or micro-controller and associated software, to determine the orientation of the slide or whether the slide is not correctly oriented on a tray 104 in the cassette 100. For example, data from the detector 152 may indicate that a slide is missing, that a slide is oriented at an angle, upside down, or that the wrong edge or slide is presented. A cytotechnologist can also determine whether these conditions exist based on a visual inspection of the slides. For example, an improperly loaded slide may be identified if the reflective marking is not aligned with the other reflective markings. The cytotechnologist can then adjust the slide, as necessary, so the slide is properly positioned and all of the slides are consistently arranged and calibrated for processing.

Various reflective markings 130 can be used to indicate the orientation of a slide within a cassette. For example, in one embodiment, shown in FIGS. 1, 2 and 7, the reflective marking 130 is applied to form two reflective sections 132 and one less reflective or non-reflective section 134 therebetween. Persons skilled in the art will appreciate that certain markings and slide surfaces may not be completely non-reflective or absorptive. Rather, some materials or surfaces may be nominally reflective, but non-reflective when compared to the reflectivity of the reflective sections for purposes of a detector or sensor distinguishing higher intensity reflected light and lower intensity reflected light. Thus, this specification refers to "non-reflective" sections for purposes of explanation, not limitation, since persons skilled in the art will appreciate that some "non-reflective" surfaces and materials are not truly 100% absorptive.

Figure 7:
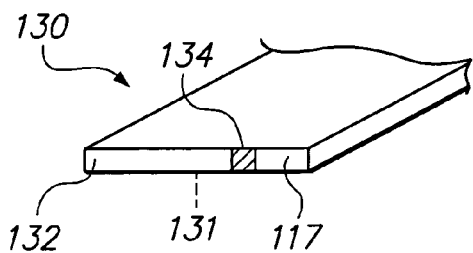
FIG. 7 is a perspective view of a slide having a reflective marking that includes two reflective sections and one non-reflective section and that is used to indicate slide orientation according to one embodiment.

In the embodiment shown in FIGS. 1, 2 and 7, one reflective section 132 extends from one end to the non-reflective section 134, and a second reflective section 132 extends from an opposite end to the non-reflective section 134. One of the reflective sections 132 is wider than the other. As a result, the non-reflective section 134 is offset from the midpoint 131 or is off-center. In other words, the reflective and non-reflective sections are asymmetrical.

The reflective markings are applied asymmetrically so that it can be determined from a stack of slides whether one or more slides are improperly oriented. For example, in a stack of slides in which all of the slides should be arranged flat on a tray and have the non-reflective section 134 offset towards the right along the "x" axis, it can be determined that all of the slides are properly oriented. However, if there are one or more slides that have the non-reflective portion 134 offset towards the left end along the "x" axis, then those slides should be re-arranged to match the orientation other slides so that all of the slides can be calibrated with a common orientation. This determination can be made by the controller 160 or visually by a cytotechnologist.

Figure 8:
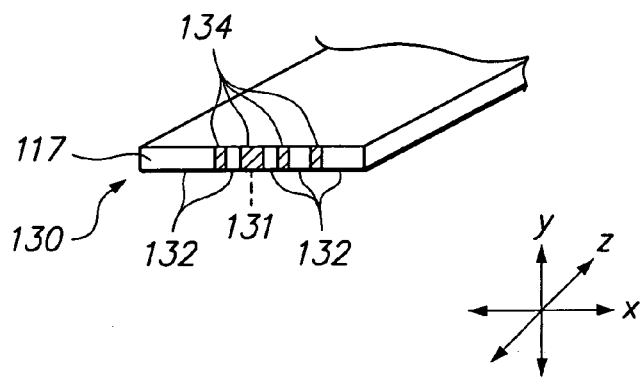
FIG. 8 is a perspective view of a slide having five reflective sections and four non-reflective sections and that is used to indicate slide orientation according to another embodiment.

In another embodiment, shown in FIG. 8, a reflective marker 130 is applied to form five asymmetric reflective sections 132 and four non-reflective marking sections 134. With reference to the midpoint 131, two reflective sections 132 and one non-reflective section 134 are to the left of the midpoint 131, whereas three reflective sections 132 and three non-reflective sections 134 are to the right of the midpoint 131 center. Thus, a calibrating system or a cytotechnologist can determine the orientation of the slide and the orientation of a slide relative to other slides as a result of the asymmetric reflective patterns.

Figure 9:
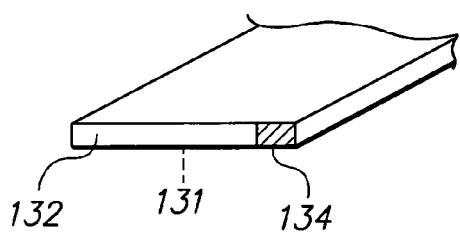
FIG. 9 is a perspective view of a slide having one reflective section and one non-reflective section and that is used to indicate slide orientation according to a further embodiment.

Referring to FIG. 9, in another embodiment of asymmetric reflective marking, the edge or side of the slide includes one reflective section 132 and one non-reflective section 134 as a result of one reflective marking being applied from the left end, leaving the other end as the non-reflective section 134.

Figure 10:
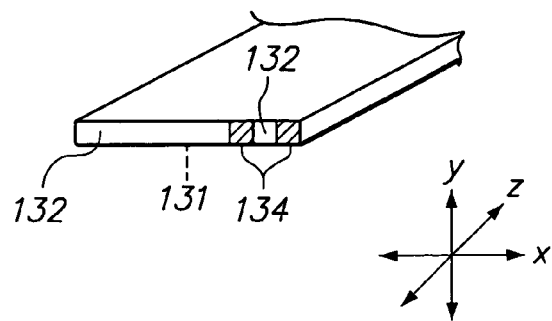
FIG. 10 is a perspective view of a slide having two reflective sections and two non-reflective sections and that is used to indicate slide orientation according to another embodiment.

FIG. 10 illustrates yet a further embodiment of an asymmetric reflective marking in which an edge or side of a slide includes two reflective sections 132 and two non-reflective sections 134.

Persons skilled in the art will appreciate that various patterns and designs of asymmetric reflective and non-reflective sections 132 and 134 can be formed, and that various designs may cover some or a majority of the edge of a slide using one or more reflective sections 132 and one or more non-reflective sections 134 with different numbers of intermediate reflective and non-reflective sections 132 and 134. Accordingly, FIGS. 7–10 are not intended to be limiting.

In the embodiments shown in FIGS. 7–10, the reflective and non-reflective sections 132 and 134 are asymmetrical for the purpose of identifying whether a slide is properly oriented. Symmetrical designs can be utilized to provide an indication whether a slide is placed on a tray or absent from a cassette slot. Using asymmetrical markings allows this function to be performed and, in addition, to determine whether the slide is oriented or positioned properly within the cassette.

In the embodiments shown in FIGS. 7–10, the reflective and non-reflective sections 132 and 134 extend between the bottom and top of the of the slide. In alternative embodiments, the reflective and non-reflective sections 132 and 134 may extend completely or partially between the bottom and top of the edge of a slide.

Figure 11:
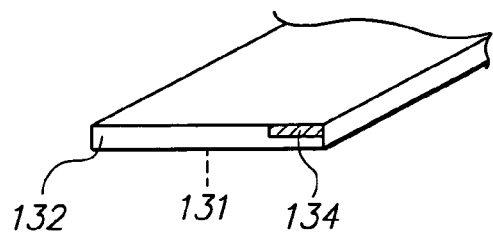
FIG. 11 is a perspective view of a slide having a non-reflective section and a reflective section that extends partially between the top and bottom of an edge of a slide according to a further embodiment.
Figure 12:
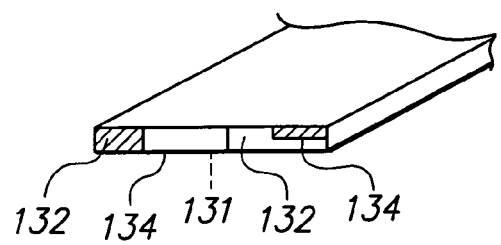
FIG. 12 is a perspective view of a slide having a reflective and a non-reflective sections that extend completely and partially between a top and a bottom of an edge of a slide according to another embodiment.

For example, referring to FIG. 11, an asymmetric marking has a reflective section 132 that extends across the entire edge of the slide, except for the top right corner, which is a non-reflective section 134. FIG. 12 illustrates another embodiment of an asymmetric marking that includes the same "top right" non-reflective corner section 134 and other non-reflective sections 134 sections that extend between the top and bottom of the edge of the slide.

In addition to the various designs and patterns of reflective and non-reflective sections 132 and 134 that can be used, the reflective and non-reflective sections 132 and 134 can be produced by different techniques and be composed of different materials. For example, in one embodiment a reflective section 132 can be formed by coating an edge of a slide with a liquid, such as an ink. One exemplary ink that can be used is an epoxy based, heat cured, semi-paste ink that can be applied to an edge of a glass slide using known screen printing equipment. In another embodiment, the reflective liquid coating is a paint.

Figure 13:
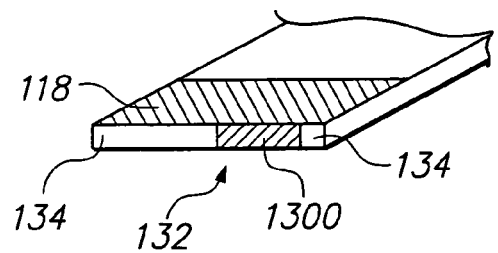
FIG. 13 is a perspective view of a slide having non-reflective section being a frosted section marking according to a further embodiment.

Referring to FIG. 13, the non-reflective or less reflective section 134 can be a surface of the edge of a glass slide, and the reflective section can be a frosted section 132. Thus, a frosted section can be applied to an edge of the slide to provide portions with different reflectivity.

Figure 14:
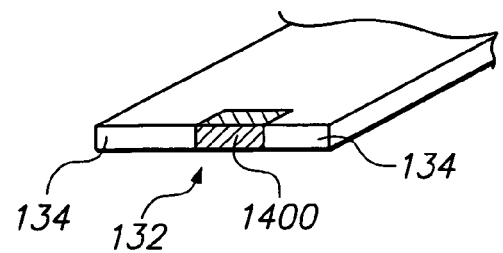
FIG. 14 is a perspective view of a slide having a non-reflective section being a tape section according to another embodiment.

In a further alternative embodiment, the reflective section 132 can be formed with a reflective adhesive coating or tape 1400, as shown in FIG. 14. The tape 1400 can, if necessary, wrap around the edge of the slide and be applied to a top of the slide.

In a further embodiment, the non-reflective section can be formed using laser etching. For example, a frosted surface of a slide can be removed with laser etching. As a result, the etched section with the frosted coating removed is the non-reflective section 134 and the non-etched section that retains the frosted coating is the reflective section 132.

In a further alternative, embodiment, one section of a glass slide can be polished so that it is more reflective than the non-polished section. Thus, the polished section can be the reflective section 132, and the unpolished section can be the non-reflective section 134. Sections of different reflectivity can also be formed by grinding or scratching an edge of the slide. In this embodiment, the reflective section 132 is the section that is not ground or scratched and the non-reflective or less reflective section 134 would be the ground or scratched section.

In some processes, slides are exposed to various solvents and other materials, such as xylene, alcohol, acetone, and ammonia. Reflective coatings of slides that are used with these processes are preferably not dissolved by these solvents. Having described the operation of system embodiments and various suitable reflective marking designs, following is a more detailed description other system components.

Referring again to FIGS. 1 and 2, the emitter 150 and the detector 152 are part of an integrated component, such as a video camera, a fiber optic sensor or a barcode scanner. One exemplary video camera is Model no. XC-HR50, available from Sony Electronics, Inc., 1 Sony Drive, Park Ridge, N.J. One suitable fiber optic sensor that can be used is Model No. FX-D1, available from SUNX, 1207 Maple, West Des Moines, Iowa. One suitable bar code scanner is model no. 10, available from Accu-Sort Systems, Inc. 511 School House Road Telford, Pa. Alternatively, the emitter 150 and detector 152 can be separate components. For purposes of explanation and illustration, this specification describes an emitter 150 and detector that are part of an integrated component, such as a video camera or fiber optic sensor (generally referred to as sensor 155).

The sensor 155 is mounted to a carrier 142. A motor 144 rotates a screw or threaded rod 146, causing the carrier 142 and the sensor 155 attached thereto to move up and down the screw 146 to different heights. In other words, activation of the motor 144 moves the sensor 155 to different heights to be positioned in front of different slides or trays for holding a slide in the cassette.

A controller 160 senses vertical position via an encoder 162 and translates the amount of rotation of the screw 146 into a height displacement to determine the height of the sensor 155, i.e., to determine the slide slot with which the emitter 150 and detector 152 are aligned. This data is used to control the motor 144 and movement of the sensor 155. In the illustrated embodiment, the encoder 162, controller 160, sensor 155 are shown as separate components, however, persons skilled in the art will appreciate that one or more of these components can be combined together in a single component. Thus, FIGS. 1 and 2 showing separate components are not intended to be limiting.

Referring to FIG. 2, if necessary, in addition to a vertical translator 140, the system can also include a horizontal translation member 200, such as a servo controlled positioner that can sweep the width of the edge of the slide along the X-axis. In the illustrated embodiment, the horizontal translation member 200 is mounted to the carrier 142 and can translate or rotate the sensor 155 or the emitter 150 and detector 152 individually so that light 151 from the emitter 150 is directed to different portions of the side or edge of the slide. In other words, a horizontal translator can be used to scan the entire edge of the slide.

Whether a horizontal or radial translator 200 is necessary may depend on the type of sensor 155 or emitter 150 and detector 152 components that are utilized. For example, a horizontal or radial translator 200 may not be necessary when using a video camera. The exemplary Model no. XC-HR50 video camera, available from Sony Electronics, Inc., would interface to a frame grabber that acquires a digital image of the edge of the slide in two dimensions (X and Y). The controller or imaging software 160 can be used to process the image and determine whether a slide is present and whether a reflective or non-reflective section falls within a specified field in order to determine whether the slide is oriented properly by comparing the image data to criteria for the appropriate reflective/non-reflective pattern. In this case, the video camera is capable of obtaining an image of the entire side or edge of the slide, and it is not necessary to rotate or horizontally translate the camera since the camera can obtain a full image of the edge of the slide without being translated or rotated to scan other portions of the edge of the slide.

In an alternative embodiment, the emitter 150 and detector 152 are part of a fiber optic sensor 155. A horizontal translator 200 may be necessary with these types of sensor 155 devices since the emitter 150 and detector 152 may be configured to process only a particular portion of the edge or side of the slide. Thus, translating the optical sensor 155 horizontally along the X axis allows the emitter 150 and detector 152 to sweep the entire side or edge.

Alternatively, the system can include multiple sensors 155 that are positioned along the X axis so that they are directed to different portions of the slide. Thus, it may not be necessary to sweep the slide with a translator when using multiple sensors 155.

Accordingly, different emitter 150, and detector 152 configurations may or may not require a horizontal translator. FIGS. 1 and 2 generally illustrate light from the emitter 150 extending across the entire edge or side of the slide for purposes of illustration, however, persons skilled in the art will appreciate that emitters 150 and detectors 152 may process smaller sections of a slide edge, and that horizontal translators may or may not be required in order to sweep the entire side or edge of a slide.

After the sensor 155 obtains the reflected light 153, the sensor 155 outputs corresponding signal or data to a controller 160. As shown, the controller 160 can be separate from the sensor 155. The controller 160 processes the signal or data received from the sensor 155 and provides a signal or other indication that one or more slides are not arranged properly. After one slide has been analyzed, the controller 160 can activate the motor to position the sensor 155 proximate to the next slide to be analyzed. This process can be repeated for each slide in the cassette.

Embodiments provide a system and method for determining whether slides are properly oriented in a cassette, so that a cytotechnologist can determine whether all of the slides in the cassette are calibrated to a common and correct orientation. Persons skilled in the art will recognize that modifications can be made to the systems and methods described herein to perform slide calibration functions. For example, the embodiments can be applied to storage receptacles that store slides in other configurations besides a vertical configuration, e.g., slides in multiple stacks or with horizontal arrangements. Further, various other reflective markings can be used. Orientation determinations can be made based on data derived from reflected light, non-reflected light or a combination thereof. In other words, although embodiments have been described using light reflected to make slide orientation determinations, a sensor can be configured to process light that is not reflected to make slide orientations determinations. Additionally, the markings may have various shapes, sizes and forms, and the examples shown in FIGS. 7–14 are merely illustrative of other markings that could be utilized. Further, the markings may be applied with various technologies, have various forms, and have different degrees of reflectivity.

Although references have been made in the foregoing description to various embodiments, persons of ordinary skill in the art will recognize that insubstantial modifications, alterations, and substitutions can be made to the described embodiments without departing from the invention as recited in the accompanying claims.

What is claimed:

1. A system for calibrating an orientation of slides within a storage receptacle, each slide having top, bottom, side and edge surfaces, the storage receptacle having one or more slots for receiving slides and one or more trays for holding a slide, the system comprising:
   a reflective marking, the reflective marking being applied to an edge of a slide, thereby forming a reflective section and a non-reflective section;
   an emitter;
   a detector, the emitter and the detector being positioned so that the emitter directs light towards the reflective and non-reflective sections of the slide, and the detector generates a signal or data representing an orientation of the slide based on the reflected or non-reflected light; and
   a controller, the controller processing signal or data from the detector to determine whether the slide is properly oriented on a tray in the storage receptacle.

2. The system of claim 1, the reflective marking being a reflective coating, the coating section being a reflective section, the non-coated section being a non-reflective section.

3. The system of claim 2, the reflective coating being an ink.

4. The system of claim 2, the reflective coating being a paint.

5. The system of claim 1, the reflective marking being a reflective adhesive coating, the adhesive coating being the reflective section, the non-adhesive section being the non-reflective section.

6. The system of claim 1, the non-reflective section being a reflective edge of the slide, and the reflective section being a frosted section.

7. The system of claim 1, the non-reflective section being a laser etched section, and the reflective section being a non-laser etched section.

8. The system of claim 1, the reflective section being a polished section, and the non-reflective section being a non-polished section.

9. The system of claim 1, the reflective section being a reflective edge of the slide, the non-reflective section being a ground or scratched section.

10. The system of claim 1, the reflective marking being applied to a majority of the edge of the slide.

11. The system of claim 1, the reflective coating being applied to less than a majority of the edge of the slide.

12. The system of claim 1, the reflective marking forming reflective and non-reflective sections that extend between a bottom and a top of the edge of the slide.

13. The system of claim 1, the reflective marking forming reflective and non-reflective sections that extend partially between a bottom and a top of the edge of the slide.

14. The system of claim 1, wherein the edge of the slide includes:
   one reflective section; and
   one non-reflective section.

15. The system of claim 14, wherein one of the reflective and non-reflective sections extends partially between a bottom and a top of the edge of the slide.

16. The system of claim 1, wherein the edge of the slide includes:
   two reflective sections; and
   one non-reflective section, the non-reflective section being between the two reflective sections.

17. The system of claim 1, wherein the edge of the slide includes:
   two or more reflective sections; and
   two or more non-reflective sections, one or more of the non-reflective sections being between two reflective sections.

18. The system of claim 1, the reflective marking being asymmetric.

19. The system of claim 18, the non-reflective sections being offset relative to a midpoint of the edge of the slide.

20. The system of claim 18, the reflective section being offset relative to a midpoint of the edge of the slide.

21. The system of claim 1, wherein reflective marking for all of the slides are aligned with each other, indicating that all of the slides are properly arranged on respective trays in the storage receptacle.

22. The system of claim 1, wherein the reflective marking is not dissolved by xylene, alcohol, acetone, or ammonia.

23. The system of claim 1, further comprising a translation member, the emitter and the detector being moveable to different slides in the slide receptacle by the translation member.

24. The system of claim 23, the translation member being a vertical translation member, the vertical translation member having:
   a threaded rod;
   a carrier, the emitter and the detector being mounted to the carrier; and
   a motor, the motor driving the threaded rod so that the carrier and the detector mounted thereto is vertically translated along the threaded rod an encoder, the encoder sensing vertical position and providing position feedback to the controller.

25. The system of claim 23, the translation member being a vertical translation member, further comprising a second translation member, the second translation member being a horizontal translation member, the horizontal translation member being mounted to the vertical translation member, the horizontal translation member translating or rotating the emitter and the detector so that light from the emitter is directed to different portions of the edge of the slide.

26. The system of claim 25, the vertical translation member having:

a threaded rod;

a carrier, the emitter and the detector being mounted to the carrier; and a motor, the motor driving the threaded rod so that the carrier and the detector mounted thereto are vertically translated along the threaded rod, an encoder, the encoder sensing vertical position and providing position feedback to the controller.

wherein the horizontal translation member is mounted to the carrier.

27. The system of claim 1, the emitter being a Light Emitting Diode.

28. The system of claim 1, the emitter and the detector being components of a video camera.

29. The system of claim 1, the emitter and the detector being components of a fiber optic sensor.

30. The system of claim 1, emitter and the detector being components of a bar code scanner.

31. The system of claim 1, the controller being separate from the detector.

32. The system of claim 1, the controller reading an encoder, wherein the encoder translates data corresponding to the operation of the translation member into data representing the location of the emitter and the detector.

33. The system of claim 1, the controller processing data related to reflected light that is received by the detector to determine whether the slide is properly oriented on a tray in the storage receptacle.

34. The system of claim 1, the controller processing data related to non-reflected light that is not detected by the detector to determine whether the slide is properly oriented on a tray in the storage receptacle.

35. The system of claim 1, the controller determining whether a slide orientation is flat or at an angle on the tray.

36. The system of claim 1, the controller determining whether a slide orientation is a top surface of the slide being upright or upside down.

37. The system of claim 1, the controller determining whether a slide orientation is the slide is flipped edge to edge.

38. A system for calibrating the orientation of a slide within a storage receptacle, each slide having top, bottom, side and edge surfaces, the storage receptacle having one or more slots for receiving slides and one or more trays for holding a slide, the system comprising:

a reflective marking, the reflective marking being applied to an edge of a slide, thereby forming an asymmetric reflective section and an asymmetric non-reflective section;

a vertical translation member;

an emitter;

a detector, the emitter and the detector being vertically moveable by the vertical translation member, the emitter directing light towards the reflective and non-reflective sections, the detector receiving light that is reflected by the reflective sections, the detector generating a signal or data representing an orientation of the slide; and the controller processing signal or data from the detector to determine whether the slide is properly oriented on a tray in the storage receptacle, wherein reflective marking for all of the slides are aligned with each other when all of the slides are properly arranged on respective trays in the storage receptacle.

39. A method of calibrating an orientation of a slide within a storage receptacle, each slide having top, bottom, side and edge surfaces, the storage receptacle having one or more slots for receiving slides and one or more trays for holding a slide, the method comprising:

asymmetrically marking at least a portion of an edge of a slide with a reflective coating, thereby forming an asymmetric reflective section and an asymmetric non-reflective section;

exposing the edge of the slide to light;

detecting light that is reflected by the reflective section; and generating data that represents an orientation of the slide based on the detected light; and determining the orientation of the slide based on the generated data.

40. The method of claim 39, asymmetrically marking comprising asymmetrically marking at least a portion of the edge of the slide with an ink or a paint.

41. The method of claim 39, asymmetrically marking comprising asymmetrically marking at least a portion of the edge of the slide with a reflective adhesive.

42. The method of claim 39, asymmetrically marking comprising marking the edge, thereby forming one or more reflective sections and one or more non-reflective sections.

43. The method of claim 39, asymmetrically marking comprising marking the edge of the slide so that the non-reflective section is offset relative to a midpoint of the edge or side of the slide.

44. The method of claim 39, asymmetrically marking comprising marking the edge of the slide so that the reflective section is offset relative to a midpoint of the edge or side of the slide.

45. The method of claim 39, determining the orientation of the slide including determining whether a slide lies flat or at an angle on the tray, a top surface of the slide is upright or upside down, an edge of the slide is facing a proper direction.

* * * * *